United States Patent [19]
Yokoi et al.

[11] 3,912,051
[45] Oct. 14, 1975

[54] SPOT TYPE DISC BRAKE

[75] Inventors: Masatada Yokoi; Kaoru Tsubouchi, both of Toyota, Japan

[73] Assignee: Aisin Seiki Kabushiki Kaisha, Kariya, Japan

[22] Filed: Oct. 2, 1970

[21] Appl. No.: 77,625

[30] Foreign Application Priority Data
Oct. 8, 1969 Japan.................... 44-96102[U]

[52] U.S. Cl. .................. 188/72.5; 92/75; 188/370
[51] Int. Cl. ........................................... F16d 55/228
[58] Field of Search ........ 188/72.5, 72.4, 370, 73.4; 92/75, 69

[56] References Cited
UNITED STATES PATENTS
3,402,790 9/1968 Rath .............................. 188/370 X
3,497,038 2/1970 Schrader et al..................... 188/370

FOREIGN PATENTS OR APPLICATIONS
968,898 9/1964 United Kingdom................ 188/72.5

Primary Examiner—George E. A. Halvosa
Attorney, Agent, or Firm—James E. Mrose

[57] ABSTRACT

A spot type disc brake having two pistons disposed in a cylinder and each surrounded by a sealing ring projecting from the wall of the cylinder. One piston is connected by a yoke to an indirectly operated brake pad and the other is connected to a directly operated brake pad. At least one piston has a flat inner end rim and a rounded outer end rim. The other piston has a curved end rim. The flat rim or rims permits a saving in the length of the cylinder, and the curved rims facilitate assembly of the pistons into the sealing rings.

3 Claims, 6 Drawing Figures

SPOT TYPE DISC BRAKE

BACKGROUND OF THE INVENTION

This invention relates to a spot type disc brake and more particularly to the same in which a hydraulic actuator is arranged at one side of the disc and is operative between a directly operated pad and a yoke engaging with an indirectly operated pad with a pair of opposed pistons worked in a cylinder of the actuator.

The brake of this type must be designed to suit a space of the wheel confined and narrow enough to permit design of a wheel of smaller capacity and weight including the brake. Further, in designing the brake of this type, it is sometimes required to enlarge the yoke for the purpose of provision of a greater bearing ability against a greater braking force. However, in order to assign a space sufficient to enlarge the yoke, there can be found no way likely to meet the requirements of such design except to reduce the length of the cylinder.

Such brake has rings respectively set in corresponding grooves formed in the wall of the cylinder to engage with the pistons working in the cylinder for preventing escape of the hydraulic fluid. The sealing ring of this kind is formed of molded flexible rubber or other suitable material and is of smaller internal diameter in its natural configuration than the internal diameter of the cylinder, so that the top surface of the ring projects slightly outwardly of the cylinder's surface and hence the ring will be yieldably biased into sliding sealing engagement with the cooperating cylinder wall, when the piston is installed within its cylinder.

The conventional brake of this type has had all its pistons rounded at their edges positioned within the cylinder, to allow the edges to smoothly pass through the projecting surfaces of the rings when the pistons are, in the assembling stage, installed within their cylinder, to eliminate the danger of scraping away the projecting portions of the rings from their bodies embedded within the grooves. We have found that there is no reason, except for the sake of such installation, why the conventional brake has had its pistons rounded at the edges positioned within the cylinder. Further, we have found that the roundness limits the effort to attain a smaller brake. There is a continual demand from the designers of the automotive vehicle for reduction of the overall size of the brake and saving in the whole weight of the wheel including the brake.

This invention was directed to a piston that is not rounded at its edge positioned in the cylinder of the brake to reduce the length of the cylinder so that a correspondingly smaller brake may result.

SUMMARY OF THE INVENTION

According to the present invention, a body member has a cylinder within which a pair of opposed pistons is slidably received. Opposed directly and indirectly operated pads are supported by two pins slidably in parallel to the axis of the cylinder and a disc rotatable integrally with the wheel is arranged in a manner such that its periphery extends between the pads. A yoke is located on the one hand in the piston remote from the disk by an inwardly extending flat tongue formed integrally with the yoke and supported by a insert member in a blind bore in the piston and on the other hand in bores of a backing plate bonded to a indirectly operated pad and supported by corresponding projections formed in the other opposed tongue. At least one of the opposed pistons is not rounded at its inside edge while rounded at the other edge revealed outside the cylinder so that a corresponding reduction of the length of the cylinder may result.

BRIEF DESCRIPTION OF THE DRAWING

The invention is further described, by way of example, with reference to the accompanying drawings, in which.

DESCRIPTION OF THE PREFERRED EMBODIMENTS

Figure 1:
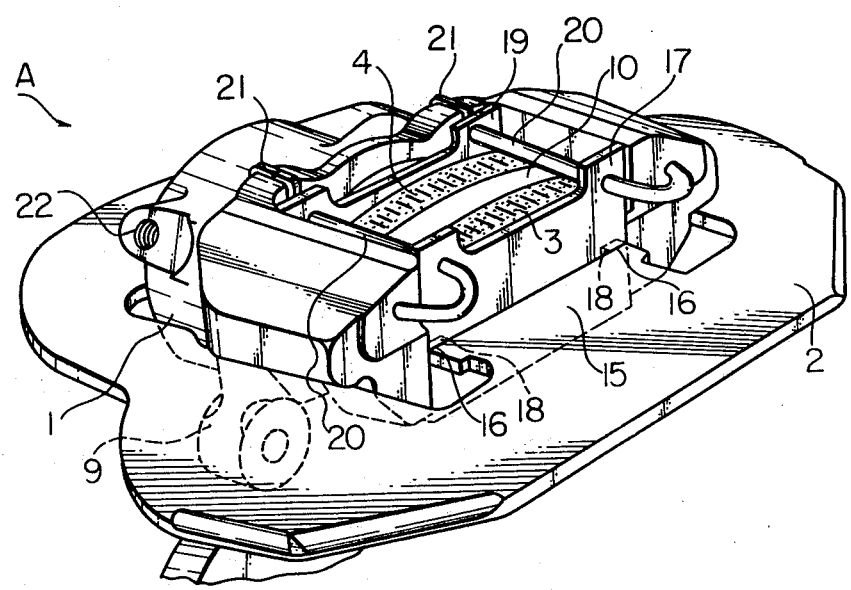
FIG. 1 is a perspective view of a spot type disc brake constructed in accordance with the invention.
Figure 2:
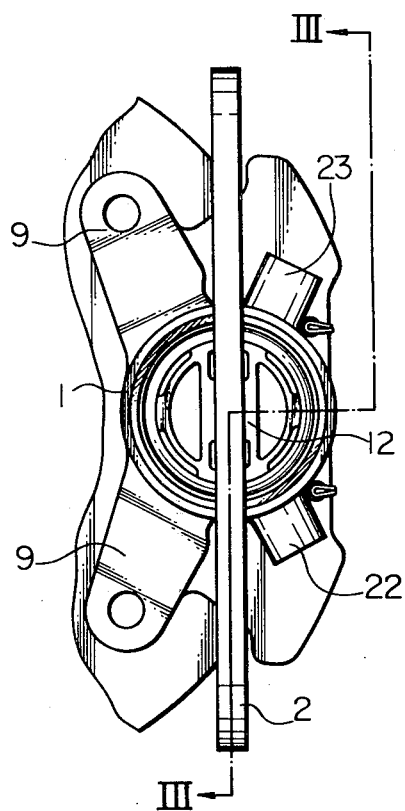
FIG. 2 is a front elevation viewed along the arrow A indicated in FIG. 1.
Figure 3:
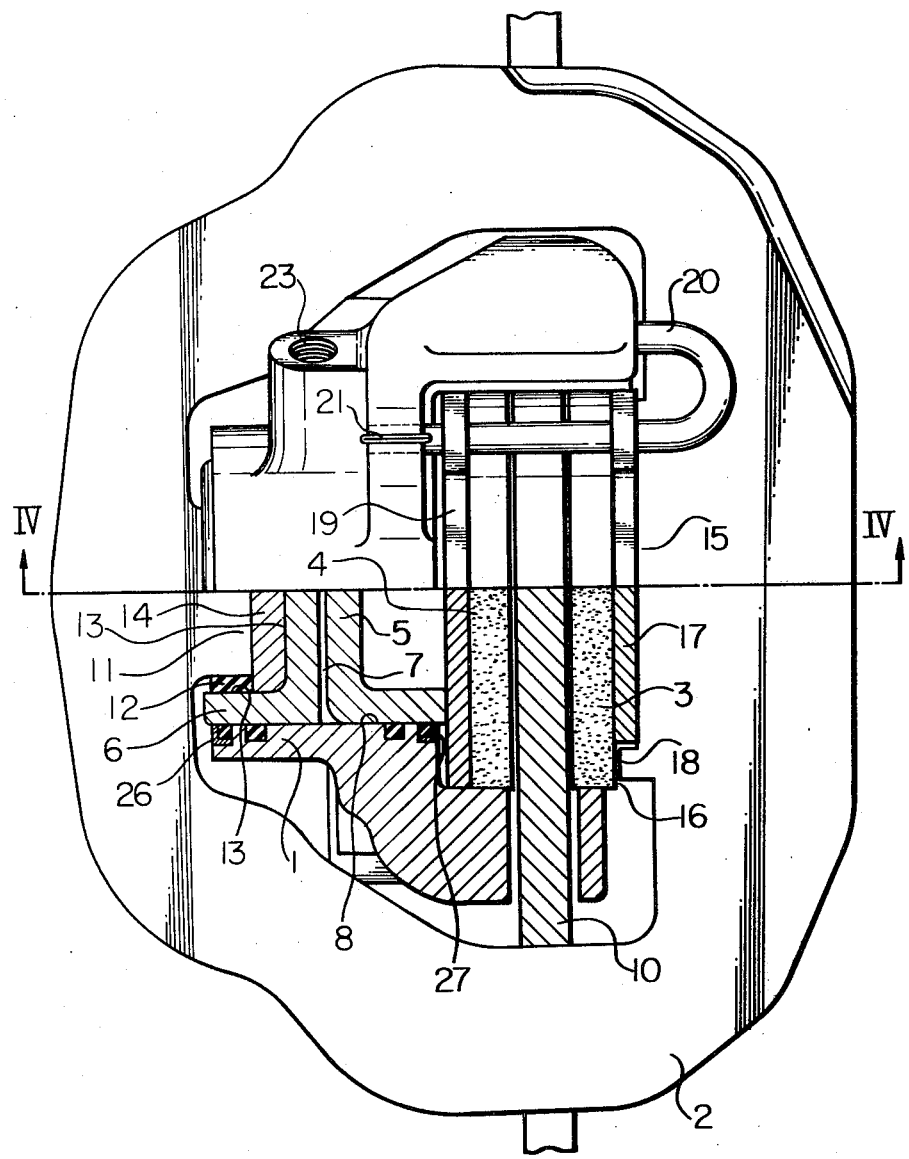
FIG. 3 is a side view half-sectioned on the line 111 — 111 of FIG. 2.

Referring to the drawings, a spot type disc brake comprises a body member 1, a yoke 2 adapted to engage with an indirectly operated pad 3 and a hydraulic actuator formed within the body member 1 and operative between the yoke 2 and a directly operated pad 4. The hydraulic actuator comprises a pair of opposed pistons 5 and 6 slidable within a cylinder 7 constituted by a through bore 8 in the body member 1.

The body member 1 has a pair of mounting lugs 9 adapted to be bolted to a torque plate or other fixed part of the wheel (not shown) mounting adjacent a disc 10 so that the disc periphery extends between the pads 3 and 4. The yoke 2 is located in the piston 6 by an inwardly extending flat tongue 11 formed integrally with the yoke and supported by a ring-like insert member 12 in a blind bore 13 in the piston 6 with the end face of the tongue abutting against a spacer member 14 interposed between the end face and the bottom of the blind bore. A second tongue 15 is similarly formed integrally with the yoke and supported by two bores 16 provided on a rigid backing plate 17 bonded or otherwise secured to the pad 3 with corresponding two projections 18 fitted the bores as illustrated in dotted lines in FIG. 1. It will be noted that the yoke 2 is received and held in position by the piston 6 and the backing plate 17 with the tongue 11 supported by the insert member 12 and the tongue 15 by the bores 16 of the backing plate 17. The other pad 4 is similarly bonded or otherwise secured to the other backing plate 19. The two backing plates are guided in substantially parallel to the axis of the disc 10 by a pair of pad-retaining pins 20 whose both ends are slidably received in suitable bores correspondingly provided in the body member 1 as illustrated in FIG. 1. The pins 20 have their one ends prevented to be drawn out from the bores by clips 21 which hold the pins 20 captive in the bore. The backing plates 17 and 19 respectively on the pads 3 and 4 have apertures through which pass the pins 20 whereby the pads 3 and 4 are suspended and located in their appropriate positions. The inlet 22 to the hydraulic cylinder 7 is interconnected with the master-cylinder (not shown) through the appropriate brake conduit. A bleed port 23 is provided at the opposite external side of the body 1. The provision of rubber boots or rings 26 and 27 at the both open ends of the cylinder is to exclude dirt from the sliding surfaces of the pistons.

Figure 4:
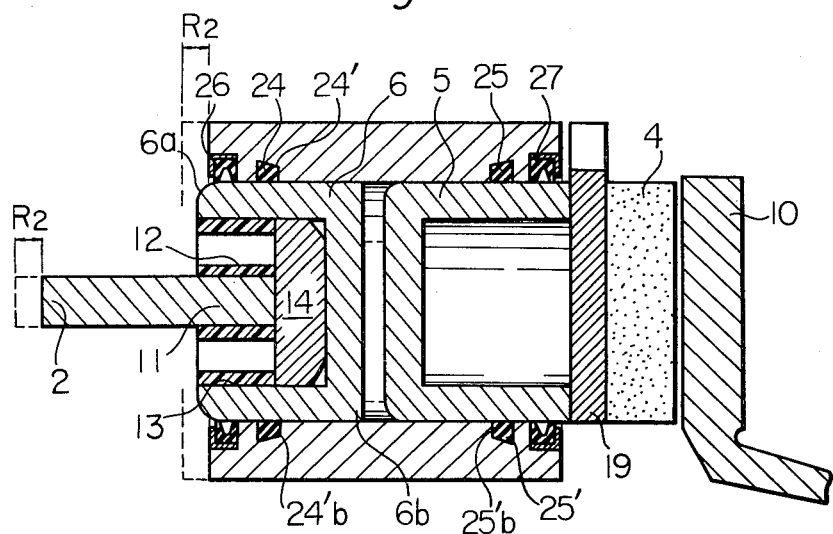
FIG. 4 is an enlarged sectional view taken along the line 1V — 1V of FIG. 3.

As can clearly be seen in FIG. 4, the piston 6 is not rounded at the edge 6b within the cylinder while at the other edge 6a revealed outside the cylinder the piston is rounded. In another embodiment illustrated in FIG. 5, both pistons 6 and 5' are not rounded at the edges 6b and 5'b within the cylinder and at the other edges revealed outside the cylinder they are rounded as indicated by the reference characters 6a and 5'a.

Figure 6:
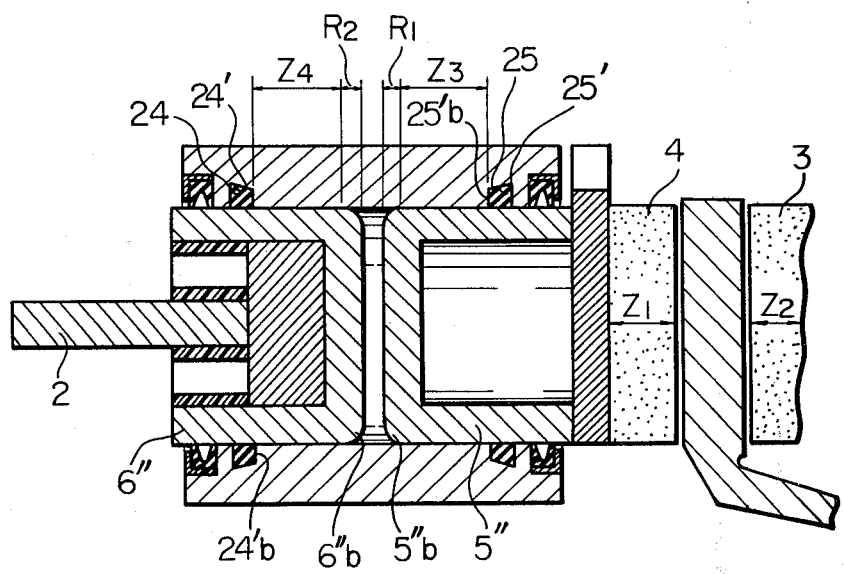
FIG. 6 is an enlarged sectional view similar to FIG. 4 of a conventional spot type disc brake, all the embodiments illustrated in from FIG. 4 to FIG. 6 are partially cut off.

In the conventional brake illustrated in FIG. 6, all the pistons 5'' and 6'' are rounded at their inside edges 5''b and 6''b for protecting the rings 24 and 25 from the danger of the scraping when the pistons are installed within the cylinder by merely inserting them inwardly from the corresponding side open ends of the cylinder.

For installation of the pistons within the cylinder of the embodiment of FIG. 4, having firstly set the rings 24 and 26 in the corresponding grooves, the handler can then insert the piston 6 into the cylinder from the right-hand open end of the cylinder to the left while keeping the rounded edge 6a in the left-hand side, without any fears that the internal top surfaces of the rings 24 and 26 might be scraped away. The bodies of the elastic material of the rings are thus compressed into the grooves and yieldably biased into engagement with the cylinder wall because of the resiliency of the elastic material, so that a sliding seal will at all times be provided between its top surface and the cylinder wall.

After the piston 6 has been installed, the rings 25 and 27 are set in the corresponding grooves and the piston 5 is next installed within the cylinder from the right-hand open end while being kept the attitude as illustrated in FIG. 4.

Figure 5:
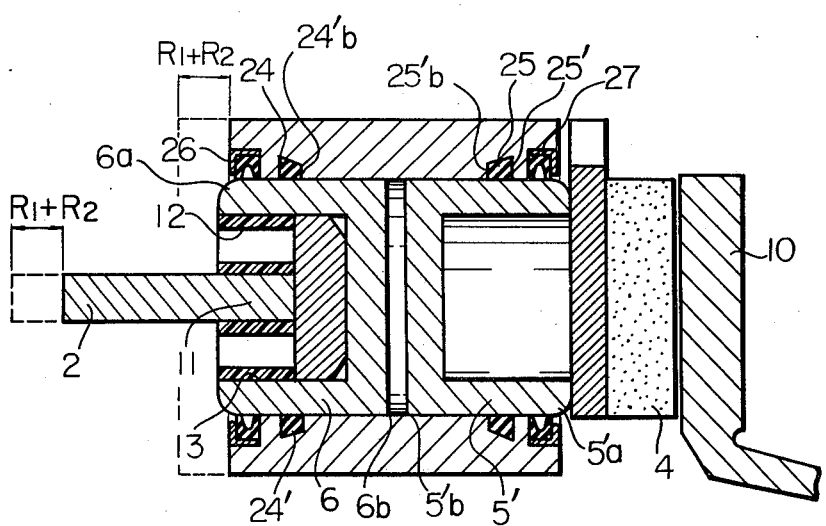
FIG. 5 is an enlarged sectional view similar to FIG. 4 of another embodiment.

In installing the pistons of the embodiment of FIG. 5, the piston 6 is inserted into the cylinder in the same manner as the preceding embodiment. However, the piston 6 is displaced to the left until its inside edge 6b which is not rounded reaches almost to the inner side wall 24'b of the groove 24'. The piston 5' is then inserted from the right-hand open end of the cylinder with the edge 5'b preceding and successively displaced to the left untill the edge closes with or almost abuts upon the other piston 6 so that the groove 25' may be left unclosed by the piston 5'. It should be noted that the cylinder is long enough to allow the piston 6 to shift to the left until the groove 25' may be left unclosed by the piston 5'. The rings 25 and 27 are last set in the corresponding grooves, and the two pistons are then together restored to their normal appropriate positions respectively as illustrated.

It will be apparent from the preceding that there is no fear in each of the above embodiments of the invention that the exposed top surfaces of the rings might be scraped away when the edge of each of the pistons passes through the rings 24 and 25 in installing each of the pistons within the cylinder.

In view of the fact that the sliding and fitting engagement must at all times be provided between the periphery of the pistons and the wall of the cylinder during the service life of the abradable pads, at least within a zone defined by the inner side wall 24'b of the groove 24' and the inner side wall 25'b of the groove 25', the design in the brake of FIG. 6 must be according to the following requirements:

The depth Z1 of the pad 4 equals the depth Z2 of the pad 3.

Z3 represents the length of fitting and sliding engagement provided between the piston 5'' and the cylinder's wall under the condition where the cylinder is pressurized at the biginning of the service life of the new pad 4.

Z4 represents similarly to Z3 the length of fitting and sliding engagement provided between the piston 6'' and the cylinder's wall, and equals Z3.

R1 represents the length necessary to provide the piston 5'' with the roundness at the indide edge 5''b.

R2 represents similarly to R1 the length necessary to provide the piston 6'' with the roundness at the inside edge 6''b, and equals R1.

The length Z3 must be somewhat greater than the depth Z1 because of the necessity to ensure the sliding sealing between the ring 25 and the piston 5'', assuming that the pad 4 is used until the whole of the pad is abraded. It is true of the length Z4 and the depth Z2, too. It will be noted that the length Z3 gradually decreases as the pad 4 is abraded during the service life of the pad.

From the preceding, it will be noted that in designing the brake according to the present invention, the length of the cylinder may advantageouslyy be shortened by the length R2 in case of the embodiment of FIG. 4, as compared with the conventional brake of FIG. 6, and further in case of the embodiment of FIG. 5, by the length R1+R2. Accordingly, the capacity of the yoke may be reduced by the length R1 or R1+R2 as illustrated, or contrarily a yoke larger by the length R1 or R1+R2 may be provided without reducing the assignment of space to the other components.

Although hereinabove questions have been with emphasis discussed with reference to the scraping of the rings 24 and 25, the same considerations apply to the rings 26 and 27.

What is claimed is:

1. A spot type disc brake comprising: a body member including a cylinder having a fluid chamber; a first and a second piston slidably reciprocable within said chamber; opposed directly and indirectly operated brake pads slidably supported on said body member and adapted to engage a brake disc; a yoke connecting one of said pistons to said indirectly operated pad, the other piston bearing against said directly operated pad; a pair of sealing rings disposed in said cylinder and projecting into said chamber, one of said rings surrounding and slidably engaging said first piston, and the other ring surrounding and slidably engaging said second piston; each of said pistons having an inner end face and an outer end face, said first piston having an inner end face with a flat rim and an outer end face with a rounded rim, said second piston having a rounded rim on one of its end faces, said pistons being disposed with their inner end faces confronting one another and being insertable into the cylinder from the same side without damage to said rings by the piston rims.

2. A spot type disc brake as described in claim 1, said second piston having a rounded rim on its inner end face.

3. A spot type disc brake as described in claim 1, said second piston having a flat rim on its inner end face and a rounded rim on its outer end face, said second piston being slidable to a position to permit insertion of one of said rings after insertion of both pistons, and returnable to a position within the after inserted ring.

\* \* \* \* \*